United States Patent [19]

Rapp

[11] 3,852,077

[45] Dec. 3, 1974

[54] GLASSES, GLASS-CERAMICS AND PROCESS FOR MAKING SAME

[75] Inventor: James Erich Rapp, Oregon, Ohio

[73] Assignee: Owens-Illinois, Inc., Toledo, Ohio

[22] Filed: Apr. 5, 1972

[21] Appl. No.: 241,448

[52] U.S. Cl................. 106/39.6, 106/47 R, 65/33, 252/63.5, 317/258
[51] Int. Cl........................... C03c 3/22, C03c 3/12
[58] Field of Search............ 106/47 R, 47 Q, 390 V, 106/52, 39.6; 65/33; 252/62.9, 63

[56] References Cited
UNITED STATES PATENTS

| | | | |
|---|---|---|---|
| 2,976,246 | 3/1961 | Egerton et al. | 252/62.9 |
| 3,084,053 | 4/1963 | Arlett et al. | 106/47 |
| 3,113,877 | 12/1963 | Janakirama-Rao | 106/47 |
| 3,114,066 | 12/1963 | Allen et al. | 106/52 |
| 3,195,030 | 7/1965 | Herczog et al. | 106/47 |
| 3,502,598 | 3/1970 | Nitta et al. | 252/62.9 |
| 3,615,757 | 10/1971 | Herczog et al. | 106/39 DV |

OTHER PUBLICATIONS

Liebertz, J. "Glasbildung in System $K_2O-GeO_2-Nb_2O_5$," Glastech. Ber., Dec. 1969, 42, (12), pg. 510.

Sarjeant et al., Formation of new non-crystalline solid (NCS) phases-Chem. Abstracts, Vol. 72, pg. 356, March 9, 1970.

Imaoka et al. "Glass–Formation on Types of Ternary Systems II Germanates of A–Group Elements," Report of the Inst. Industrial Science, (Tokyo) Vol. 19, No. 3, March 1963, pp. 161–2, 188–190, 183–185.

Smith, G. P., "Optical Materials: Glasses & Glass-Ceramics," Optical Spectra, March/April 1969, p. 36–37.

Primary Examiner—Winston A. Douglas
Assistant Examiner—Mark Bell
Attorney, Agent, or Firm—E. J. Holler; Charles S. Lynch

[57] ABSTRACT

Thermally crystallizable glasses of the $A - B - GeO_2$ system wherein A is $Na_2O$, $Li_2O$, or a mixture of $Na_2O$ with $K_2O$ and/or $Li_2O$ and B is $Nb_2O_5$ or a mixture of $Nb_2O_5$ and $Ta_2O_5$ and glass-ceramics made therefrom which have high dielectric constants and low dissipation factors or loss tangents, which glasses and glass-ceramics are suitable for use as capacitors and dielectrics, and particularly for thick-film dielectric pastes utilized in the manufacture of micro-electronic printed circuits. By varying the heat treatment schedule for crystallization of the glass to a glass ceramic, a specific high dielectric constant coming within a prescribed range can be imparted to the finished, glass ceramic. Glasses are also disclosed of the system $RO-Nb_2O_5-GeO_2$ wherein RO is SrO, BaO or PbO. These glasses may be treated to form transparent glass-ceramics.

15 Claims, No Drawings

GLASSES, GLASS-CERAMICS AND PROCESS FOR MAKING SAME

Glass ceramics produced in accordance with the present invention have been found to have excellent dielectric properties, including high dielectric constants and very low dielectric losses, which make them suitable for use in a variety of electrical devices, such as capacitors, electroluminescent cells, wave guides, thick-film dielectric pastes for micro-electronic printed circuits and the like. Dielectric constants of over about 150 (at room temperature and 0.5 MHz) and as high as 500 and even over 1000, with accompanying low dissipation factors, i.e., below 5 percent and even below 1 percent, are obtained with glass ceramics of the present invention. The temperature coefficient of capacitance ($T^{cc}$), defined as the change in capacitance over capacitance at 25°C ($\Delta C)/C_{25\ \ c}$) can also be adjusted by heat treatment to make it positive, negative or zero. $T^{cc}$ values of from $-15$ to $+40$ percent have been obtained, with many glassceramics of the invention exhibiting values of from 0 to about $+6$ percent from 0° to 100°C.

Each of the thermally crystallizable glasses of the present invention can, during an appropriate heat treatment process, be converted to a transparent, inorganic crystalline oxide ceramic material having any desired dielectric constant between a selected upper and lower limit. The ceramic material thus formed, also known as a glass-ceramic, contains a major portion of very tiny crystals embedded in a minor glassy matrix remaining as a result of the thermal crystallization.

Glass-ceramics of the present invention can also be prepared in the form of small chips, of a size of about one-fourth inch or less, which are suitable for use as support carriers for electronic microcircuits. Chip capacitors are produced by casting, pressing and metallizing/heat treating in a continuous operation, Such capacitors are of the general purposes or high-frequency/positive temperature coefficient. Dielectric constants range up to 1,000 or more and the dissipation factor is preferably less than 3.5 percent and usually less than 1 percent with the temperature coefficient of capacitance being positive or negative.

Within the broad spectrum of the thermally crystallizable glasses of the A — B — $GeO_2$ system of the invention wherein A is $Na_2O$ or a mixture of $Na_2O$ with $K_2O$ and/or $Li_2O$ and B is $Nb_2O_5$ or a mixture of $Nb_2O_5$ with $Ta_2O_5$ and the molar ratio of A to B is within the range of 0.7:1 to 1.4:1, it has been found that a narrow range of several compositions have unexpectedly high dielectric properties when made into glass-ceramics. One such thermally crystallizable composition, having good glass-forming properties, is the $Na_2O\ Nb_2O_5$—$GeO_2$ system wherein the three sole essential ingredients are within the following narrow ranges:

| Ingredient | Preferred Range Mole Percent | Broad Range Mole Percent |
| --- | --- | --- |
| $GeO_2$ | 32 – 36 | 30 – 40 |
| $Nb_2O_5$ | 32 – 34 | 30 – 35 |
| $Na_2O$ | 32 – 34 | 30 – 35 |

Glasses of the foregoing composition are thermally in situ crystallized to glass-ceramics having high dielectric constants and low dissipation factors with the constants varying depending on the heat treatment to which the glasses are subjected during crystallization.

While the most stable glasses are obtained when the molar ratio of $Na_2O$ to $Nb_2O_5$ is about 1, good glasses are also formed when the ratio of $Na_2O$ to $Nb_2O_5$ is from about 0.8:1 to about 1.2:1.

Several compositions were prepared by melting together $GeO_2$ and $Nb_2O_5$, together with sufficient sodium carbonate to produce the $Na_2O$, in the mole percents set forth in the following table. Other compositions were also similarly prepared wherein $K_2O$ or $Li_2O$ charged as the respective alkali metal carbonate, were used in lieu of the $Na_2O$.

Each of the twelve compositions was heated to a temperature sufficient to melt the ingredients and then held at that temperature for about 1–24 hours, the time

TABLE I

Composition in Mole Percent

| Ingredient | 1 | 2 | 3 | 4 | 5 | 6 | 7 | 8 | 9 | 10 | 11 | 12 |
| --- | --- | --- | --- | --- | --- | --- | --- | --- | --- | --- | --- | --- |
| $GeO_2$ | 35 | 32.5 | 25 | 40 | 35 | 50 | 25 | 20 | 30 | 40 | 30 | 20 |
| $Nb_2O_5$ | 32.5 | 33.75 | 37.5 | 20 | 32.5 | 25 | 37.5 | 40 | 35 | 20 | 25 | 40 |
| $Na_2O$ | 32.5 | 33.75 | 37.5 | 40 | — | — | — | — | — | — | — | — |
| $K_2O$ | — | — | — | — | 32.5 | 25 | 37.5 | 40 | — | — | — | — |
| $Li_2O$ | — | — | — | — | — | — | — | — | 35 | 40 | 45 | 40 |

TABLE II

| | Compositions | | | |
| --- | --- | --- | --- | --- |
| Glass Ceramic Properties | 1 | 5 | 6 | 9 |
| Transparent Heat Treatment | | | | |
| Temp., °F (time, hours) | 1050(2) | 1225(2) | 1450(2¼) | 1075(1½) |
| | 1175(1) | 1200(1¼) | | |
| Dielectric Constant (R.T., 0.5 MHz) | 47.7 | 48.4 | 50.3 | 76.2 |
| Dissipation Factor (%) (R.T., 0.5 MHz) | 1.3 | 1.8 | 0.7 | 15.8 |
| Opaque Heat Treatment. | | | | |
| Temp., °F (time, hours) | 1175(2) | 1350(2) | 1575(2) | 1125(2) |
| | 1150(1) | 1200(¼) | 1450(½) | 1150(1/6) |
| Dielectric Constant (R.T., 0.5 Mhz) | 174.3 | 70.1 | 67.6 | 114.4 |
| Dissipation Factor (%) (R.T., 0.5 MHz) | 1.1 | 1.9 | 1.0 | 14.9 | being dependent on the specific composition and how long it took for the melting to be completed and a homogeneous melt to be formed. The melt was periodically stirred during this time. Each molten composition was then poured onto a metal plate and another metal plate immediately placed over it to quench the composition. The glass-forming tendencies of each composition were then judged on the ability of the melt to be quenched into glass chips between the metal plates.

Compositions 1 and 2, which came within the composition range set forth above with respect to the $Na_2O$—$Nb_2O_5$—$GeO_2$ system, formed glasses readily while compositions 3 and 4 which are outside the defined range, gave poor results, with only very small areas of glass being formed between the quenched plates.

The dielectric constant and dissipation factor of each glass-ceramic was then measured and is reported in Table II.

Glass-ceramics of the $Na_2O$—$Nb_2O_5$—$GeO_2$ system were found to have unexpectedly higher dielectric properties than those systems having $K_2O$ or $Li_2O$ in lieu of the $Na_2O$, and, correspondingly, much lower dissipation factors than the $Li_2O$-containing glass-ceramics.

By subjecting the glases of the $Na_2O$—$Nb_2O_5$—$GeO_2$ system of the invention to varying temperatures and times during the crystallization process, the dielectric constant and the dissipation factor of the glass-ceramic can be made to vary to as high as 350 or more and to less than 1.6, respectively. This is evident from the following Table.

TABLE III

| Opaque Heat Treatment | Compositions | | | | | | |
|---|---|---|---|---|---|---|---|
| | 1 | 1 | 1 | 1 | 1 | 1 | 1 |
| Temp., °F(time, hours) | 1250(2) 1150(1) | 1200(2) 1175(1) | 1250(2) 1175(1) | 1410(2) 1175(1) | 1200(2) | 1200(4) | 1200(8) |
| Dielectric Constant (R.T., 0.5 MHz) | 327.3 | 149.4 | 305.6 | 213.3 | 224.3 | 245.7 | 240.1 |
| Dissipation Factor (%) (R.T., 0.5 MHz) | 0.9 | 1.0 | 0.9 | 1.3 | 1.1 | 1.0 | 1.5 |
| Temperature Coefficient of Capacitance(TCC) (%) (0-100°C) | — | — | — | 1.0 | 1.8 | 2.0 | 5.0 |

When $K_2O$ is substituted for the $Na_2O$, as in compositions 5, 6, 7 and 8, good glasses are obtained when the composition comes within the following ranges:

| Ingredient | Mole Percent |
|---|---|
| $GeO_2$ | 22-50 |
| $Nb_2O_5$ | 25-40 |
| $K_2O$ | 25-40 |

Compositions 5, 6 and 7 form good glasses and, in fact, rods could be drawn from the melt of composition 6. Composition 8, however, having an amount of $GeO_2$ which is outside the above range, gives poor results with very little glass being formed. While excellent glasses are formed when the $K_2O$ to $Nb_2O_5$ molar ratio is about 1, the ratio can vary from about 1.6:1 to about 0.4:1.

When $Li_2O$ is substituted for the $Na_2O$, as in compositions 9, 10, 11 and 12, glasses are obtained when the composition comes within the following ranges.

| Ingredient | Mole Percent |
|---|---|
| $GeO_2$ | 22-50 |
| $Nb_2O_5$ | 25-40 |
| $Li_2O$ | 25-45 |

With composition 12 which falls outside of the above range, there was no glass formation when the melt is quenched. Again, it is preferable that the $Li_2O$ to $Nb_2O_5$ molar ratio be about 1, but good glasses are obtained when the ratio is from about 2:1 to about 1:1.

Each of the compositions of Table I which formed glasses were then subjected to the heat treatment set forth in Table II to crstallize the glass to glass-ceramic.

Glass-ceramics of the $K_2O$—$Nb_2O_5$—$GeO_2$ system on the other hand, never exceeded a dielectric constant of 75. Glass-ceramics of the $Li_2O$—$Nb_2O_5$—$GeO_2$ system, such as Example 9, could also have different dielectric constants imparted thereto by varying the heat treatment during crystallization. However, with dielectric constants of 177 and 238, the dissipation factor was 83 and 216 percent respectively, making them unsuitable for electrical capacitors. With compositions of the invention, as set forth in Table III, the dissipation factor was less than 2 percent.

Excellent dielectric properties were obtained when mixed alkali-metal oxides were used in the alkali metal oxide—$Nb_2O_5$ — $GeO_2$ system, as long as $Na_2O$ was present as one of the ingredients. Furthermore, good quality transparent and opaque glass ceramics were obtained from this system when the ingredients fell within the following ranges

| Ingredient | Mole Percent |
|---|---|
| $GeO_2$ | 18 -40 |
| $Nb_2O_5$ | 25 -45 |
| Alkali Metal Oxides | 25 -45 | wherein the alkali metal oxides are $Na_2O$ plus $K_2O$ and/or $Li_2O$ and the molar ratio of $Na_2O$ to $K_2O$ and/or $Li_2O$ is from about 1:1 to about 3:1. Further, the molar ratio of the alkali metal oxides to $Nb_2O_5$ is from 0.7:1 to 1.4:1 and when such ratio is 1:1, then the alkali metal oxides and the $Nb_2O_5$ must each be present in amounts of at least 30 mole percent.

The following glasses were prepared in the same manner discussed above, namely melting the ingredients and quenching the melt between metal plates.

TABLE IV

Compositions in Mole Percent

| Ingredient | 13 | 14 | 15 | 16 | 17 | 18 | 19 | 20 |
|---|---|---|---|---|---|---|---|---|
| $GeO_2$ | 30 | 35 | 20 | 25 | 30 | 30 | 30 | 20 |
| $Nb_2O_5$ | 35 | 32.5 | 40 | 37.5 | 35 | 35 | 35 | 40 |
| $Na_2O$ | 17.5 | 16.25 | 20 | 18.75 | 26.25 | 17.5 | — | — |
| $K_2O$ | 17.5 | 16.25 | 20 | 18.75 | 8.75 | — | 17.5 | 20 |
| $Li_2O$ | — | — | — | — | — | 17.5 | 17.5 | 20 | the glasses were then subjected to the following heat treatment schedules.

TABLE V

| Transparent Glass Ceramics | 13 | 14 | 15 | 16 | 17 | 18 | 19 |
|---|---|---|---|---|---|---|---|
| Heat Treatment Temp °F.(time, hours) | 1050(2) 1125(½) | 1050(2) 1150(½) | 1075(2) 1175(2) | — | 1050(2) | 975(2) | — |
| Dielectric Constant (R.T., 0.5 MHz) | 41.1 | 30.9 | 21.2 | — | 33.5 | 31.8 | — |
| Dissipation Factor (R.T., 0.5 MHz) | 0.2 | 0.2 | 1.7 | — | 0.3 | 0.7 | — |
| Opaque Glass Ceramics | | | | | | | |
| Heat Treatment Temp °F.(time, hours) | 1250(2) | 1175(2) 1150(½) | 1500(2) | 1250(2) | 1300(2) | 1275(2) 1075(½) | 1125(2) 1075(½) |
| Dielectric Constant (R.T., 0.5 MHz) | 220.6 | 212.6 | 1099 | 209.3 | 525.4 | 166.0 | 72.1 |
| Dissipation Factor (%) R.T., 0.5 MHz) | 0.5 | 0.3 | 3.6 | 3.3 | 1.1 | 0.5 | 2.3 |
| TCC(%) (0–100°C) | — | — | — | — | −13.2 | — | — |

Additional glasses coming within the scope of the alkali metal oxide mixture — $Nb_2O_5$—$GeO_2$ system defined above are the following:

| Ingredient | Composition in Mole Percent | | |
|---|---|---|---|
| | 21 | 22 | 23 |
| $GeO_2$ | 40 | 40 | 40 |
| $Nb_2O_5$ | 35 | 25 | 30 |
| Alkali metal oxide | 25 | 35 | 30 |

With respect to the glass ceramic of Composition 15, the dielectric constant is about 1,100 while it is in excess of 500 in the glass ceramic of composition 17. It has been noted that the dielectric constant and the dissipation factor for each of the glasses of the above invention can be made to vary, depending upon the heat treatment to which the glass is subjected. For example, composition 13, when subjected to the following heat treatments, gave the following dielectric properties as set forth in Table VI:

TABLE VI

Composition 13

| Heat Treatment for Opaque Glass Ceramic | | | | | |
|---|---|---|---|---|---|
| Temp., °F(time, hours) | 1125(2) 1125(¼) | 1350(2) | 1500(2) | 1125(2) 1600(¼) | 1600(2) |
| Dielectric Constant (R.T., 0.5 MHz) | 179.5 | 320.4 | 305.5 | 271.3 | 301.1 |
| Dissipation Factor (%) | 0.7 | 1.6 | 2.6 | 2.5 | 2.4 |
| TCC (0–100°C) % | −7.13 | — | — | — | — |

As seen in Table V, the dielectric constant was in excess of 150 in all of the glass-ceramics of the invention, while the dissipation factor was less than 4 percent. Compositions 15 and 16 when subjected to the following heat treatments gave the following dielectric prroperties as set forth in Tables VII and VIII

TABLE VII

Composition 15

| Heat Treatment for Opaque Glass Ceramic | | | | | | | |
|---|---|---|---|---|---|---|---|
| Temp., °F.(time, hours) | 1250(2) | 1300(2) | 1350(2) | 1400(2) | 1600(½) | 1700(¼) | 1500(2) |
| Dielectric Constant (R.T., .5 MHz) | 228.5 | 604.8 | 770.9 | 779.6 | 846.5 | 572.7 | 1099 |
| Dissipation Factor (%) (R.T., MHz) | 3.7 | 2.9 | 3.0 | 3.2 | 3.1 | 3.6 | 3.6 |
| TCC (0–100°C) % | — | +27.7 | +19.95 | +20.1 | +37.3 | +37.9 | — |

TABLE VIII

| Heat Treatment for Opaque Glass Ceramic | | | | | | | |
|---|---|---|---|---|---|---|---|
| Temp., °F.(time, hours) | 1250(2) | 1275(2) | 1300(2) | 1350(2) | 1372(2) | 1400(2) | 1700(¼) |
| Dielectric Constant (R.T., 0.5 MHz) | 209.3 | 240.7 | 318.8 | 406.2 | 435.7 | 425.7 | 473.4 |
| Dissipation Factor (%) (R.T., MHz) | 3.3 | 4.9 | 2.6 | 6.1 | 3.8 | 2.8 | 2.8 |
| TCC (0–100°C) % | — | — | — | — | — | — | — |

Glass-ceramics having excellent dielectric properties are also obtained from the mixed alkali metal oxide — $Nb_2O_5$—$GeO_2$ system when a part of the $Nb_2O_5$ is replaced by $Ta_2O_5$ so that the molar ratio of $Nb_2O_5$ to $Ta_2O_5$ is from about 3:1 to about 1:1. Examples coming within the scope of the invention are as follows:

| Ingredient | Compositions in mole percent | |
|---|---|---|
|  | 24 | 25 |
| $GeO_2$ | 30 | 30 |
| $Nb_2O_5$ | 26.25 | 17.5 |
| $Ta_2O_5$ | 8.75 | 17.5 |
| $Na_2O$ | 17.5 | 17.5 |
| $K_2O$ | 17.5 | 17.5 |

When compositions 24 and 25 were subjected to the heat treatments set forth in the following table, the resulting dielectric constant and the dissipation factor varied. Although the presence of the $Ta_2O_5$ decreased the dielectric constant of the glass-ceramic, it also decreased the dissipation factor.

By utilizing the glasses of the present invention, dielectric constants unexpectedly higher than those exhibited by conventional ceramic materials are obtained. Heating the glasses to a given temperature increases the dielectric constant to a maximum value and thereafter longer heat treatments or times tend to decrease it. Thus, there is an optimum time and temperature of heat treatment for each composition coming within the scope of the invention to produce the most favorable dielectric properties.

In addition to the foregoing, it has also been discovered that glasses within the system $RO$—$Nb_2O_5$—$GeO_2$ wherein RO is SrO, BaO or PbO, can be heat treated to produce transparent glass ceramics having an index of refraction higher than that of glass and in excess of 2.000 and also having high dielectric constants, i.e., in excess of 50 and low dissipation factors, i.e., about 1 percent or less, both in the transparent and in the opaque glass-ceramic. Glasses coming within the foregoing system and capable of producing the aforementioned properties in glass-ceramics made therefrom consist essentially of the following:

| Ingredient | Mole Percent |
|---|---|
| $GeO_2$ | 35–45 |
| $Nb_2O_5$ | 28–45 |
| RO | 14–32 | wherein the molar ratio of $Nb_2O_5$ to RO is from about 1:1 to about 2:1 and RO is either SrO, PbO or BaO. When the molar ratio of $Nb_2O_5$ to RO is 3:1, no glasses can be formed from the mixture.

The following compositions were prepared.

In forming the glass melts of the compositions, the batch materials consisted of $GeO_2$, $Nb_2O_5$ and PbO, charged as the oxides, while SrO and BaO were charged as strontium carbonate and barium carbonate, respectively.

| Ingredient | Compositions in Mole Percent | | | | | | |
|---|---|---|---|---|---|---|---|
|  | 26 | 27 | 28 | 29 | 30 | 31 | 32 |
| $GeO_2$ | 42.9 | 42.9 | 42.9 | 42.9 | 40 | 40 | 40 |
| $Nb_2O_5$ | 42.8 | 35.7 | 42.8 | 35.7 | 30 | 30 | 30 |
| BaO | — | — | 14.3 | 21.4 | — | 30 | — |
| SrO | 14.3 | 21.4 | — | — | — | — | 30 |
| PbO | — | — | — | — | 30 | — | — |

Glasses were formed from all of the above compositions with the exception of 26 and 28. Several of the glasses were subjected to the following heat treatment and the resulting properties are set forth in Table X.

TABLE IX

| Transparent Glass Ceramic | Compositions | | | | | | |
|---|---|---|---|---|---|---|---|
|  | 24 | 24 | 24 | 25 | 25 | 25 | 25 |
| Heat Treatment Temp., °F(time, hours) | 1200(2) | — | — | 1200(2) 1325(¼) | — | — | — |
| Dielectric Constant (R.T., MHz) | 145.2 | — | — | 91.6 | — | — | — |
| Dissipation Factor (%) (R.T., 0.5 MHz) | 1/6 | — | — | 1.6 | — | — | — |
| Translucent Glass Ceramic | | | | | | | |
| Heat Treatment Temp. °F, (time, hours) | 1250(2) | 1300(2) | 1350(2) | 1300(2) | 1350(2) | 1400(2) | 1450(2) |
| Dielectric Constant (R.T. 0.5 MHz) | 168.8 | 234.4 | 217.4 | 117.4 | 126.0 | 159.6 | 173.8 |
| Dissipation Factor (%) (R.T., 0.5 MHz) | 1.6 | 1.2 | 1.2 | 1.0 | 0.7 | 0.5 | 0.6 |
| Opaque Glass Ceramic | | | | | | | |
| Heat Treatment Temp. °F. (time, hours) | 1250(8) | 1600(2) | — | — | — | — | — |
| Dielectric Constant (R.T., 0.5 MHz) | 171.8 | 292.4 | — | — | — | — | — |
| Dissipation Factor (%) (R.T. 0.5 MHz) | 1.5 | 0.9 | — | — | — | — | — |

TABLE X

|  | 27 | 27 | 29 | 30 | 30 |
|---|---|---|---|---|---|
| Index of Refraction of Glass | 2.043 | 2.043 | 2.123 | 2.043 | — |
| Transparent Glass Ceramic Heat Treatment. Temp. °F. (time, hours) | 1335(2) | 1250(2) 1450(½) | 1200(2) | 1335(2) | 1350(2) |
| Index of Refraction of Glass Ceramic | 2.115 | 2.108 | 2.134 | 2.103 | — |
| Dielectric Constant of Transparent Glass Ceramic (R.T., 0.5 MHz) | — | 89.9 | 187 | — | 85 |
| Dissipation Factor % (R.T., 0.5 MHz) | — | 0.3 | 0.74 | — | 0.25 |
| Opaque Glass-Ceramic Heat treatment Temp. °F(time, hours) | — | — | 1335(2) | — | — |
| Dielectric Constant (R.T., 0.5 MHz) | — | — | 258 | — | — |
| Dissipation Factor (R.T., 0.5 MHz) | — | — | 1.1 | — | — |

Glasses and glass-ceramics having high indices of refraction are suitable for use in acoustooptical devices, electrooptical devices and other devices utilizing transparent glasses and glass-ceramics having such high indices of refracton. All of these aforesaid devices are known in the art.

While the glasses and glass-ceramics of the invention have been discussed in terms of the sole essential ingredients, it will be evident to those skilled in the art that minor amounts, preferably not more than 10 percent and most preferably no more than 5 percent by weight of other metal oxides which are compatible with the glass and glass-ceramic compositions can be used. Care should be taken, however, to insure that such other metal oxides do not materially affect the basic characteristics of the glasses and glass-ceramics of the present invention, including the high dielectric constants, low dielectric losses or dissipation factors and high indices of refraction.

What is claimed is:

1. A glass ceramic material having a dielectric constant of about 1,099 and a dissipation factor of less than 4 percent, said glass ceramic formed by thermal in situ crystallization of a thermally crystallizable glass consisting essentially of the following composition:

| Ingredient | Mole % |
|---|---|
| $GeO_2$ | 18 – 40 |
| $Nb_2O_5$ | 25 – 45 |
| Alkali metal oxides | 25 – 45 | wherein said alkali metal oxides are a mixture of $Na_2O$ + $K_2O$ and/or $Li_2O$, the molar ratio of said $Na_2O$ to said $K_2O$ and/or $Li_2O$ is from about 1:1 to about 3:1, the molar ratio of said alkali metal oxides to said $Nb_2O_5$ is from 0.7:1 to 1.4:1 and, when said molar ratio of said alkali metal oxides to said $Nb_2O_5$ is about 1:1, then said oxide and said $Nb_2O_5$ must be present in amounts of at least 30 mole percent each.

2. A thermally crystallizable glass suitable for crystallization to a glass ceramic having a dielectric constant in excess of about 150 and a dissipation factor of less than 2 percent, said glass consisting essentially of the following composition:

| Ingredients | Mole Percent |
|---|---|
| $GeO_2$ | 30 – 40 |
| $Nb_2O_5$ | 30 – 35 |
| $Na_2O$ | 30 – 35 | wherein the molar ratio of $Na_2O$ to $Nb_2O_5$ is from about 0.8:1 to about 1.2:1.

3. The thermally crystallizable glass as defined in claim 2 wherein said glass consists essentially of the following composition:

| Ingredients | Mole Percent |
|---|---|
| $GeO_2$ | 32 – 36 |
| $Nb_2O_5$ | 32 – 34 |
| $Na_2O$ | 32 – 34 | and the molar ratio of said $Na_2O$ to said $Nb_2O_5$ is about 1.

4. A glass-ceramic body having a dielectric constant in excess of about 150 (room temperature, 0.5 MHz) and a dissipation factor of less than 2 percent, said glass-ceramic prepared by thermal in situ crystallization of a thermally crystallizable glass consisting essentially of the composition of claim 2.

5. The glass ceramic as defined in claim 4 wherein said thermally crystallizable glass consists essentially of the glass composition of claim 3.

6. The glass ceramic as defined in claim 4 wherein said dielectric constant is with the range of about 150 to about 350 and said dissipation factor is less than 1.6 percent.

7. A thermally crystallizable glass suitable for crystallization to a glass ceramic having a dielectric constant in excess of about 150 (room temperature, 0.5 MHz) and a dissipation factor of less than 4 percent, said glass consisting essentially of the following composition:

| Ingredient | Mole Percent |
|---|---|
| $GeO_2$ | 18 – 40 |
| $Nb_2O_5$ | 25 – 45 |
| Alkali Metal Oxides | 25 – 45 | wherein said alkali metal oxides are a mixture of $Na_2O$ plus $K_2O$ and/or $Li_2O$, the molar ratio of said $Na_2O$ to said $K_2O$ and/or $Li_2O$ is from about 1:1 to about 3:1, the molar ratio of said alkali metal oxides to said $Nb_2O_5$ is from 0.7:1 to 1.4:1 and when said molar ratio of said alkali metal oxides to said $Nb_2O_5$ is about 1:1, then said oxides and said $Nb_2O_5$ must be present in amounts of at least 30 mole percent each.

8. A glass-ceramic material having a dielectric constant in excess of about 150 (Room temperature, 0.5 MHz) and a dissipation factor of less than 4 percent, said glass-ceramic formed by thermal in situ crystallization of a thermally crystallizable glass consisting essentially of the composition of claim 7.

9. The glass ceramic material as defined in claim 8 wherein said molar ratio of said alkali metal oxides to said $Nb_2O_5$ is about 1:1.

10. The glass ceramic as defined in claim 8 wherein said dielectric constant is within the range of from about 150 to about 1,100.

11. The glass ceramic as defined in claim 8 wherein said dissipation factor is less than 1 percent.

12. The glass ceramic as defined in claim 8 wherein said temperature coefficient of capacitance (0°–100°C) is from −15 to +40 percent.

13. The thermally crystallizable glass as defined in claim 7 wherein a portion of said $Nb_2O_5$ is replaced by $Ta_2O_5$ and the molar ratio of said $Nb_2O_5$ to said $Ta_2O_5$ is from about 3:1 to about 1:1.

14. The glass-ceramic as defined in claim 8 wherein a portion of said $Nb_2O_5$ in said thermally crystallizable glass is replaced by $Ta_2O_5$ and the molar ratio of said $Nb_2O_5$ to said $Ta_2O_5$ is from about 3:1 to about 1:1.

15. A thermally crystallizable glass suitable for crystallization to a glass ceramic, said glass consisting essentially of the following composition:

| Ingredients | Mole Percent |
|---|---|
| $GeO_2$ | 22 – 50 |
| $Nb_2O_5$ | 25 – 40 |
| $Li_2O$ | 25 – 45 | wherein the molar ratio of $LiO_2$ to $Nb_2O_5$ is from about 2:1 to about 1:1.

* * * * *

UNITED STATES PATENT OFFICE
CERTIFICATE OF CORRECTION

PATENT NO. : 3,852,077
DATED : Dec. 3, 1974
INVENTOR(S) : James Erich Rapp

It is certified that error appears in the above-identified patent and that said Letters Patent are hereby corrected as shown below:

Col. 2, Table II, under "9", "1075(1-1/2)" should be --- 1075(2-1/2).
Col. 3, line 68, "crstallize" should be --- crystallize ---;
Col. 4, line 10, "glases" should be --- glasses ---.
Col. 5, Table VI, after "Dissipation Factor (%)" insert --- (R. T., 0.5MHz) ---; Col. 6, line 55, "prroperties" should be --- properties ---.
Col. 9, line 25, "refracton" should be --- refraction ---.

Signed and Sealed this twenty-seventh Day of January 1976

[SEAL]

Attest:

RUTH C. MASON
Attesting Officer

C. MARSHALL DANN
Commissioner of Patents and Trademarks